US010876613B2

(12) United States Patent
Leitner et al.

(10) Patent No.: US 10,876,613 B2
(45) Date of Patent: Dec. 29, 2020

(54) DIFFERENTIAL GEAR FOR A MOTOR VEHICLE

(71) Applicant: MAGNA POWERTRAIN GMBH & CO KG, Lannach (AT)

(72) Inventors: Martin Leitner, Behamberg (AT); Bernhard Mühl, Dietach (AT)

(73) Assignee: MAGNA POWERTRAIN GMBH & CO KG, Lannach (AT)

(*) Notice: Subject to any disclaimer, the term of this patent is extended or adjusted under 35 U.S.C. 154(b) by 29 days.

(21) Appl. No.: 16/316,801

(22) PCT Filed: Jun. 13, 2017

(86) PCT No.: PCT/EP2017/064430
§ 371 (c)(1),
(2) Date: Jan. 10, 2019

(87) PCT Pub. No.: WO2018/015072
PCT Pub. Date: Jan. 25, 2018

(65) Prior Publication Data
US 2020/0182341 A1 Jun. 11, 2020

(30) Foreign Application Priority Data
Jul. 20, 2016 (DE) .................. 10 2016 213 233

(51) Int. Cl.
*F16H 48/22* (2006.01)
*F16H 48/10* (2012.01)
(Continued)

(52) U.S. Cl.
CPC ............ *F16H 48/22* (2013.01); *F16H 48/10* (2013.01); *F16H 48/40* (2013.01); *F16H 2048/202* (2013.01)

(58) Field of Classification Search
CPC .... F16H 48/10; F16H 48/11; F16H 2048/106; F16H 2048/108
See application file for complete search history.

(56) References Cited

U.S. PATENT DOCUMENTS 5,234,072 A   8/1993  Chludek
6,450,915 B1  9/2002  Kazaoka et al.
(Continued)

FOREIGN PATENT DOCUMENTS

AT       76367 T    6/1992
DE    4122126 A1    1/1993
(Continued)

OTHER PUBLICATIONS

International Search Report and Written Opinion dated Sep. 15, 2017 from corresponding International Patent Application No. PCT/EP2017/064430 with English translation of International Search Report.
(Continued)

*Primary Examiner* — Derek D Knight
(74) *Attorney, Agent, or Firm* — Dickinson Wright PLLC

(57) ABSTRACT

A differential gear for a motor vehicle, comprising an outer housing, the outer housing being drive-connected to an input element, an inner housing, the inner housing being mounted rotatably at least partially within the outer housing, at least two compensating elements and at least two output elements, the compensating elements and the output elements being enclosed at least partially by the inner housing, and the inner housing being drive-connected to the output elements via the compensating elements, and also at least one switching unit, the switching unit being arranged on the inner housing in such a way that, starting from a freewheeling (Continued)

position, it can selectively be drive-connected to the outer housing or to the outer housing and one of the two output elements.

20 Claims, 5 Drawing Sheets

(51) Int. Cl.
*F16H 48/40* (2012.01)
*F16H 48/20* (2012.01)

(56) References Cited

U.S. PATENT DOCUMENTS

| | | |
|---|---|---|
| 2009/0266198 A1 | 10/2009 | Nosakowski |
| 2016/0010736 A1* | 1/2016 | Schimpf .................. F16H 48/22 475/248 |

FOREIGN PATENT DOCUMENTS

| | | |
|---|---|---|
| DE | 102008063904 A1 | 7/2010 |
| DE | 102011080002 A1 | 1/2013 |
| EP | 0093813 A1 | 11/1983 |
| EP | 2407334 A2 | 1/2012 |
| WO | WO2015075541 A1 | 5/2015 |

OTHER PUBLICATIONS

German Search Report dated May 26, 2017 from corresponding German Patent Application No. 102016213233.4.

* cited by examiner

DIFFERENTIAL GEAR FOR A MOTOR VEHICLE

CROSS-REFERENCE TO RELATED APPLICATIONS

This application is a National Stage of International Application No. PCT/EP2017/064430, filed Jun. 13, 2017, which claims the benefit and priority to German Patent Application No. DE 10 2016 213 233.4 filed Jul. 20, 2016. The entire disclosures of each of the above applications are incorporated herein by reference.

FIELD OF THE INVENTION

The present invention relates to a differential gear for a motor vehicle, comprising an outer housing, the outer housing being drive-connected to an input element, an inner housing, the inner housing being mounted rotatably at least partially within the outer housing, at least two compensating elements and at least two output elements, the compensating elements and the output elements being enclosed at least partially by the inner housing, and the inner housing being drive-connected to the output elements via the compensating elements, and at least one switching unit.

BACKGROUND OF THE INVENTION

This section provides information related to the present disclosure which is not necessarily prior art.

A differential gear (also called a differential transmission or a differential) is a special planetary gear mechanism which can be found in motor vehicles as an axle differential and/or as a center differential or a transfer case. Axle differentials serve to compensate for different rotational speeds of two wheels of a drive axle of the motor vehicle. Center differentials serve to compensate for different mean rotational speeds of two drive axles of the motor vehicle.

As a rule, a differential gear comprises a housing, at least two compensating elements which are mounted rotatably on a pin, and at least two output elements. In a simple embodiment of a differential gear, the housing is driven via a bevel gear drive or a spur gear drive—here, the housing is connected fixedly to a ring gear or a spur gear as an input element. The torque is transmitted from the housing to, for example, two output elements via, for example, two compensating elements which are not connected to one another in a torque-relevant manner. The output elements are connected fixedly in each case to driven shafts.

In modern motor vehicles, switch-off systems for selectively switching off a drive axle and/or a lateral axle of a drive axle are used in combination with a differential gear. Furthermore, locking systems for locking a differential gear are also frequently used.

SUMMARY OF THE INVENTION

This section provides a general summary of the disclosure, and is not a comprehensive disclosure of its full scope or all of its features.

It is an object of the invention to specify a differential gear which, in the case of a compact and simple construction, combines the compensating function of a differential gear, a selective switch-off function and a selective locking function of the differential gear.

The object is achieved by way of a differential gear for a motor vehicle comprising an outer housing, the outer housing being drive-connected to an output element, an inner housing, the inner housing being mounted rotatably at least partially within the outer housing, at least two compensating elements and at least two output elements, the compensating elements and the output elements being enclosed at least partially by the inner housing, and the inner housing being drive-connected to the output elements via the compensating elements, and at least one switching unit, the switching unit being arranged on the inner housing in such a way that, starting from a freewheeling position, it can selectively be drive-connected to the outer housing or to the outer housing and one of the two output elements.

The differential gear according to the invention comprises an outer housing which is connected to an input element.

In addition, the differential gear according to the invention comprises an inner housing which is mounted rotatably within the outer housing at least partially and encloses at least two compensating elements and at least two output elements at least partially.

Furthermore, the differential gear according to the present invention comprises at least one switching unit, the switching unit being arranged according to the invention on the inner housing in such a way that, starting from a freewheeling position of the differential gear, it can selectively be drive-connected to the outer housing or to the outer housing and one of the two output elements.

The differential gear according to the invention is distinguished by a simple structural construction and makes the combination of the compensation function of the differential gear with selectively a switch-off function and selectively a locking function possible in a very small installation space.

Developments of the invention are specified in the dependent claims, the description and the appended drawings.

The switching unit preferably comprises a first switching element, it being possible for the first switching element to be drive-connected to the outer housing.

The first switching unit is preferably configured as a first selector sleeve or a first friction clutch.

The switching unit further preferably comprises a second switching element, it being possible for the second switching element to be drive-connected to one of the two output elements.

The second switching element is preferably configured as a second selector sleeve or a second friction clutch.

In one advantageous design variant of the present invention, the input element is connected fixedly to the outer housing by means of a welded connection, in particular a laser welded connection. A single-piece embodiment of the input element and the outer housing is likewise conceivable, however.

The differential gear is further preferably configured as a spur gear mechanism.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In the following text, the invention will be described by way of example with reference to the drawings, in which:

FIG. 4b shows a perspective view of a differential gear from FIG. 4a.

FIG. 5 shows a sectional view of a differential gear along the sectional plane A-A according to FIG. 4a.

DETAILED DESCRIPTION OF THE INVENTION

Figure 1:
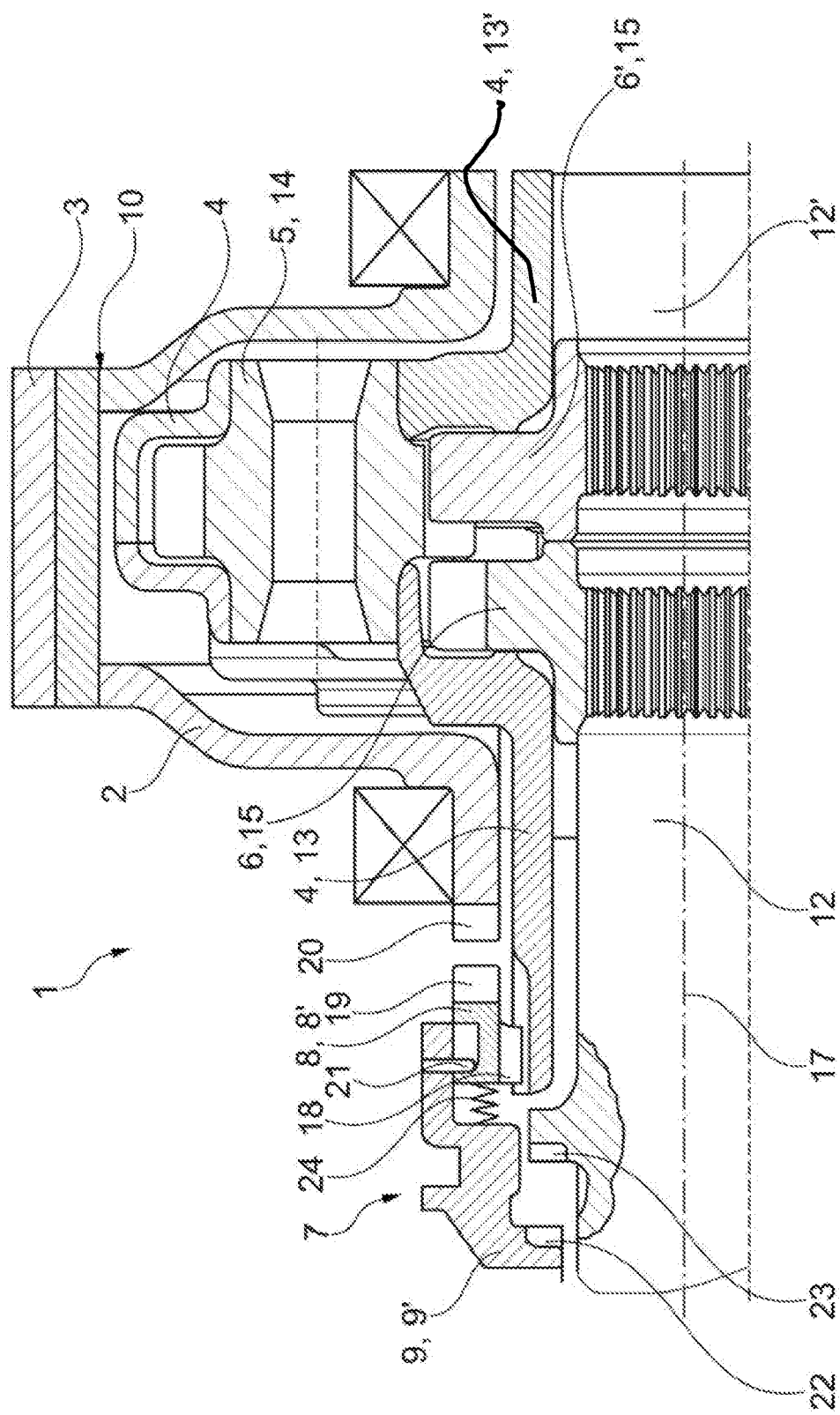
FIG. 1 shows a sectional view of a first exemplary embodiment of a differential gear according to the invention.

The embodiments shown with different detailing in FIG. 1 to FIG. 5 of a differential gear 1 according to the invention are configured in each case as spur gear mechanisms with a planetary gear set 11.

The differential gear 1 according to the invention comprises an outer housing 2 and an inner housing 4.

The outer housing is connected via a welded connection 10 (here, a laser welded connection) to an input element 3 (here, a spur gear).

The inner housing 4 of the differential gear 1 is surrounded partially by the outer housing 2 and is mounted by way of a plain bearing rotatably in said outer housing 2.

Figure 4B:
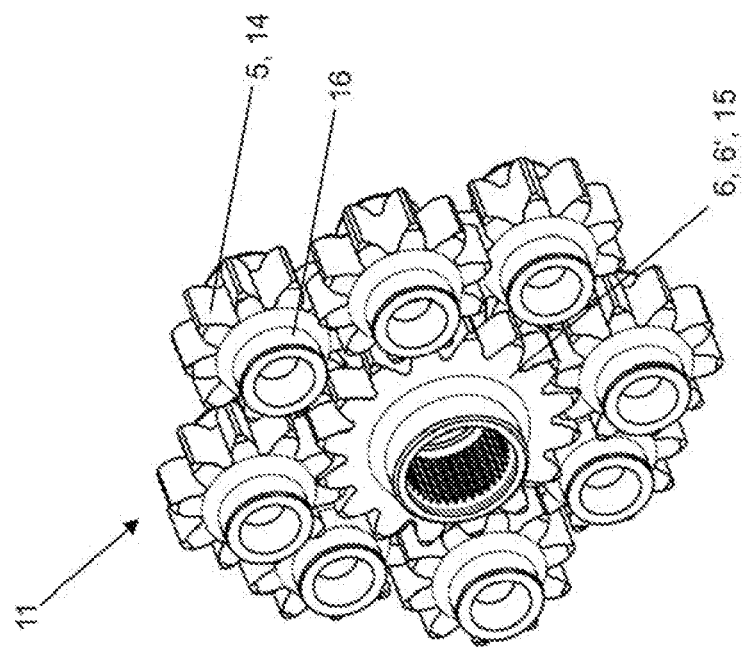
Figure 4A:
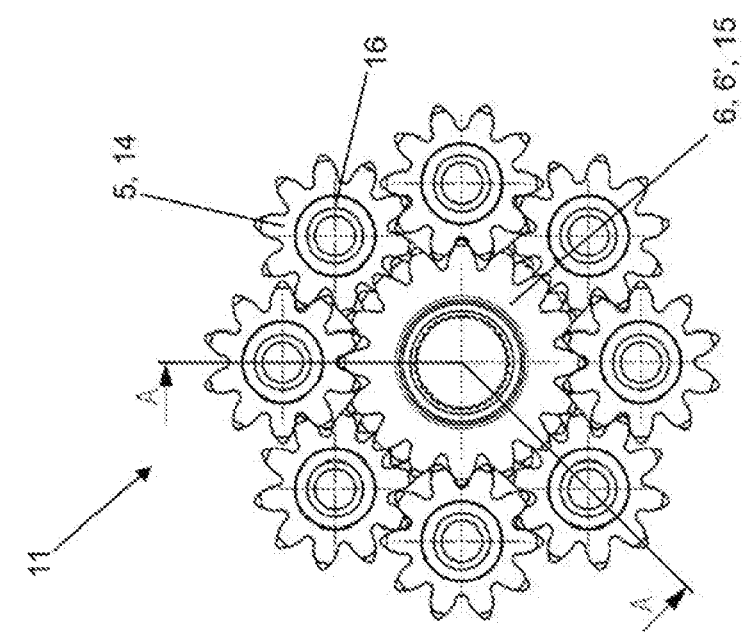
FIG. 4a shows a detailed view of an exemplary differential gear.
Figure 5:
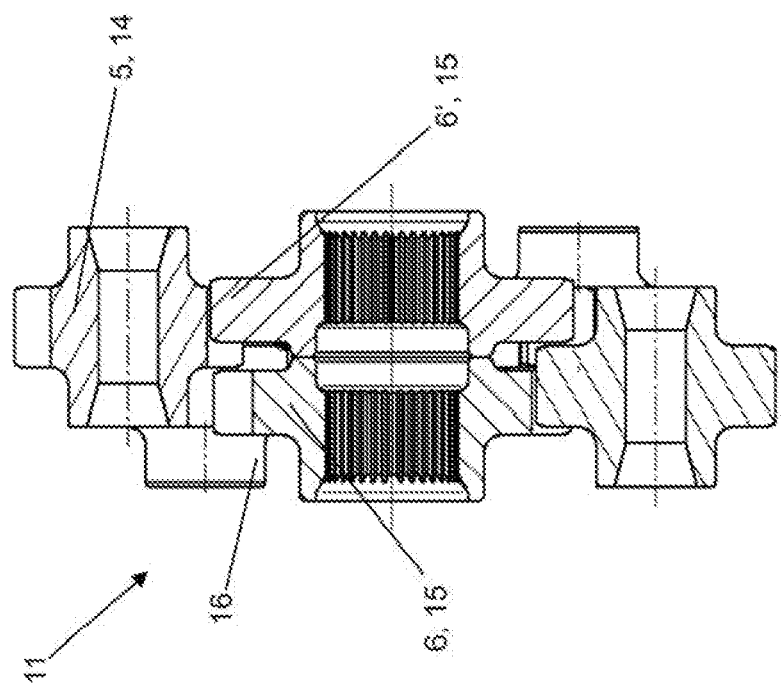

The differential gear 1 has eight compensating elements 5 which are in each case the planetary gears 14 of the planetary gear set 11, and two output elements, namely a first output element 6 and a second output element 6', which are in each case the sun gears 15 of the planetary gear set 11. The inner housing 4 of the differential gear 1 encloses the planetary gear set 11. (FIG. 4a; FIG. 4b, FIG. 5)

The eight compensating elements 5 are in each case of identical configuration and are mounted rotatably in each case on a pin 16 which is fastened to the inner housing 4. In each case one compensating element 5 meshes with two other compensating elements 5 and an output element 6, 6'—four compensating elements 5 mesh with the first output element 6, and four compensating elements 5 mesh with the second output element 6'. (FIG. 4a; FIG. 4b, FIG. 5).

The first output element 6 is drive-connected to a first output shaft 12, and the second output element 6' is drive-connected to a second output shaft 12'.

The inner housing 4 of the differential gear 1 has two axial projections, namely a first axial projection 13 and second axial projection 13', the first axial projection 13 surrounding the first output shaft 12 partially, and the second axial projection 13' surrounding the second output shaft 12' partially.

The term "axial" describes a direction along or parallel to the central longitudinal axis 17 of the differential gear 1.

Furthermore, the differential gear 1 comprises a switching unit 7, the switching unit 7 being arranged on the inner housing 4 of the differential gear 1, more precisely on the first axial projection 13 of the inner housing 4 of the differential gear 1, the switching unit 7 being enclosed neither by the outer housing 2 nor by the inner housing 4 of the differential gear 1.

Starting from a freewheeling position, the switching unit 7 can selectively be drive-connected to the outer housing 2, or to the outer housing 2 and the first output element 6, more precisely the first output shaft 12.

The switching unit 7 can therefore assume different switching positions by way of axial movement, the freewheeling position corresponding to a position of the switching unit 7, in which position no type of drive connection is established via the switching unit between individual components of the differential gear 1.

A first position corresponds to a position of the switching unit 7, in which position the outer housing 2 of the differential gear 1 is drive-connected to the inner housing 4 of the differential gear 1 via the switching unit 7.

A second position corresponds to a position of the switching unit 7, in which position the outer housing 2 of the differential gear 1 is drive-connected via the switching unit 7 to the inner housing 4 of the differential gear 1 and to the first output shaft 12.

In the following text, the different exemplary embodiments shown in FIG. 1 to FIG. 3 of a differential gear 1 according to the invention will be described, functionally identical elements being provided in each case with identical designations.

FIG. 1 shows a first exemplary embodiment of a differential gear 1 according to the invention.

The switching unit 7 comprises a first switching element 8 and a second switching element 9, it being possible for the first switching element 8 and the second switching element to be actuated axially via an actuator unit (not shown).

In FIG. 1, the first switching element 8 of the switching unit 7 is configured as a first selector sleeve 8', and the second switching element 9 of the switching unit 7 is configured as a second selector sleeve 9'.

The first selector sleeve 8' is arranged such that it can be moved axially on the inner housing 4 of the differential gear 1 via a first spline system 18 which is configured on the outer circumference of the first axial projection 13 of the inner housing 4 of the differential gear 1. The first selector sleeve 8' has an axially extending dog toothing system 19 on a side which faces the outer housing 2 of the differential gear 1. The outer housing has an axially extending second dog toothing system 20 on a side which faces the switching unit 7 of the differential gear 1, it being possible for the first dog toothing system 19 and the second dog toothing system 20 to be brought into positively locking engagement via an axial movement of the first selector sleeve 8'.

The second selector sleeve 9' of the switching unit 7 is connected via a second spline system 21 to the first selector sleeve 8' of the switching unit 7 such that it can be displaced axially counter to a spring force of an axially acting spring element 24. The second selector sleeve 9' has a third dog toothing system 22 on the side which faces the outer housing 2 of the differential gear 1. A fourth dog toothing system 23 is configured on the outer circumference of the first output shaft 12, it being possible for the third dog toothing system 22 and the fourth dog toothing system 23 to be brought into positively locking engagement via an axial movement of the second selector sleeve 9' counter to the force of the spring element 24.

In FIG. 1, the switching unit 7 is situated in the freewheeling position. In the case of an axial displacement of the second selector sleeve 9' to the right in relation to FIG. 1 via the actuator unit (not shown), the first selector sleeve 8' is displaced to the right in relation to FIG. 1 via the spring force of the spring element 24 and establishes a positively locking connection between the two housings, namely the outer housing 2 and the inner housing 4, via the engagement of the first dog toothing system 19 into the second dog toothing system 20—the force flow is closed, the freewheeling function of the differential gear 1 is switched off, and a force flow occurs from the outer housing 2 to the two output shafts 12, 12'. The outer housing 2 and the inner housing 4 can therefore be selectively disconnected—via the switching function of the switching unit 7 from the freewheeling position into the first position (position 1); a "disconnecting function" is therefore realized.

If the second selector sleeve 9' is displaced further to the right in relation to FIG. 1 by the actuator unit, the spring element 24 is compressed axially, and a positively locking engagement of the third dog toothing system 22 into the fourth dog toothing system 23 occurs. The additional coupling which is achieved in this way between the outer housing 2 of the differential gear 1 and the first driven shaft 12 disables the compensating function of the differential gear 1 and therefore acts as a differential lock.

Figure 2:
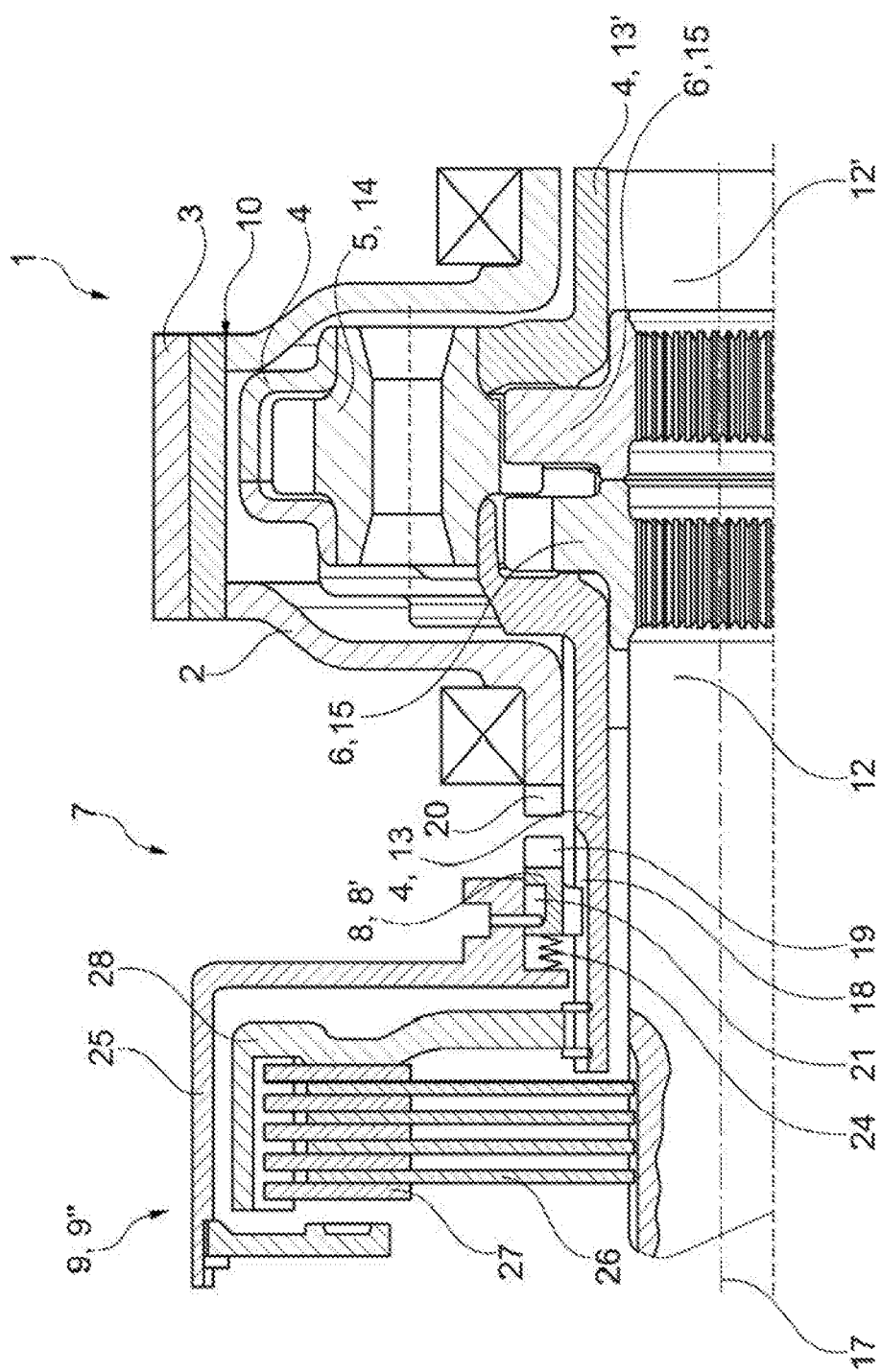
FIG. 2 shows a sectional view of a second exemplary embodiment of a differential gear according to the invention.

FIG. 2 shows a second exemplary embodiment of a differential gear 1 according to the invention.

The switching unit 7 comprises a first switching element 8 and a second switching element 9, it being possible for the first switching element 8 and the second switching element to be actuated axially via an actuator unit (not shown).

In FIG. 2, the first switching element 8 of the switching unit 7 is configured as a first selector sleeve 8', and the second switching element 9 of the switching unit is configured as a second friction clutch 9''.

The first selector sleeve 8' is arranged on the inner housing 4 of the differential gear 1 such that it can be moved axially via a first spline system 18 which is configured on the outer circumference of the first axial projection 13 of the inner housing 4 of the differential gear 1. The first selector sleeve 8' has an axially extending first dog toothing system 19 on a side which faces the outer housing 2 of the differential gear 1. The outer housing has an axially extending second dog toothing system 20 on a side which faces the switching unit 7 of the differential gear 1, it being possible for the first dog toothing system 19 and the second dog toothing system 20 to be brought into positively locking engagement via an axial movement of the first selector sleeve 8'.

The friction clutch 9'' of the switching unit 7 comprises a multiple disk assembly with inner disks 26 and outer disks 27 which are arranged in an alternating manner, the inner disks 26 being placed axially displaceably on the first output shaft 12 and the outer disks 27 being placed axially displaceably on a clutch basket 28. The clutch basket 28 is arranged fixedly on the inner housing 4 of the differential gear 1, more precisely the first axial projection 13 of the inner housing 4. Furthermore, the second friction clutch 9'' comprises an actuating arm 25, the actuating arm 25 being connected via a second spline system 21 to the first selector sleeve 8' of the switching unit 7 such that it can be displaced axially counter to a spring force of an axially acting spring element 24. The second friction clutch 9'' can be actuated via the actuating arm 25 by way of an axial displacement of said actuating arm 25 to the right in relation to FIG. 2. The axial displacement of the actuating arm 25 is actuated via the actuator unit. The actuating arm 25 is configured in such a way that it actuates the friction clutch 9'' on a side which faces away from the outer housing 2 of the differential gear 1.

In FIG. 2, the switching unit 7 is situated in the freewheeling position. In the case of an axial displacement of the actuating arm 25 via the actuator unit to the right in relation to FIG. 2, the first selector sleeve 8' is displaced via the spring force of the spring element 24 to the right in relation to FIG. 2, and establishes a positively locking connection between the two housings, namely the outer housing 2 and the inner housing 4, via the engagement of the first dog toothing system 19 into the second dog toothing system 20—the force flow is closed, the freewheeling function of the differential gear 1 is switched off, and a force flow from the outer housing 2 to the two output shafts 12, 12' occurs. The outer housing 2 and the inner housing 4 can therefore be selectively disconnected—a "disconnecting function" is therefore realized via the switching function of the switching unit 7 from the freewheeling position into the first position.

If the actuating arm 25 of the second friction clutch 9'' is displaced by the actuator unit further to the right in relation to FIG. 2, the spring element 24 is compressed axially, and the second friction clutch 9'' is actuated via the actuating arm 25—a frictionally locking connection between the inner disks 26 and the outer disks 27 of the second friction clutch 9'' occurs. The additional coupling which is achieved in this way between the outer housing 2 of the differential gear 1 and the first driven shaft 12 disables the compensating function of the differential gear 1 and therefore acts as a differential lock.

Figure 3:
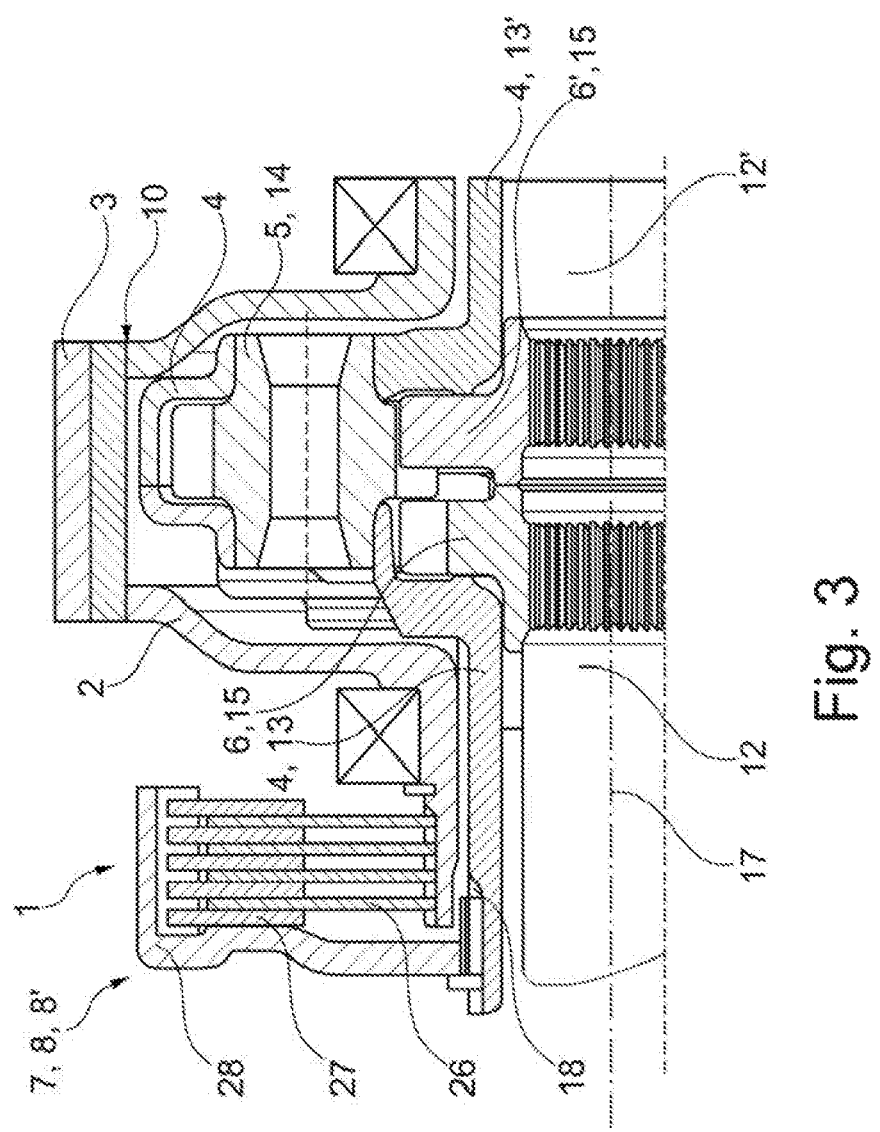
FIG. 3 shows a sectional view of a third exemplary embodiment of a differential gear according to the invention.

FIG. 3 shows a third exemplary embodiment of a differential gear 1 according to the invention, in which the disconnecting function of the differential gear 1 is realized via a first friction clutch 8''. The switching unit 7 of the exemplary embodiment of a differential gear 1 according to the invention which is shown in FIG. 3 comprises just one switching element 8, 9.

In the exemplary embodiment which is shown in FIG. 3, the switching element 8 of the switching unit 7 is configured as a second friction clutch 8''.

The second friction clutch 8'' comprises a multiple disk assembly with inner disks 26 and outer disks 27 which are arranged in an alternating manner, the inner disks 26 being placed axially displaceably on the outer housing 2 of the differential gear 1 and the outer disks 27 being placed axially displaceably on a clutch basket 28. The clutch basket 28 is arranged on the inner housing 4 of the differential gear 1, more precisely the first axial projection 13 of the inner housing 4, such that it can be displaced axially via a first spline system 18.

The second friction clutch 8'' can be actuated via an actuator unit (not shown). Coupling of the inner housing 4 to the outer housing 2 occurs by way of a frictionally locking connection between the inner disks 26 and the outer disks 27—the force flow is closed, the freewheeling function of the differential gear 1 is switched off, and a force flow from the outer housing 2 to the two output shafts 12, 12' occurs. The outer housing 2 and the inner housing 4 can therefore be selectively disconnected—a "disconnecting function" is therefore realized via the switching function of the switching unit 7 from the freewheeling position into the first position.

LIST OF DESIGNATIONS

1 Differential gear
2 Outer housing
3 Input element
4 Inner housing
5 Compensating element
6 First output element
6' Second output element
7 Switching unit
8 First switching element
8' First selector sleeve
8'' First friction clutch
9 Second switching element
9' Second selector sleeve
9'' Friction clutch
10 Welded connection
11 Planetary gear set 12 First output shaft
12' Second output shaft
13 First axial projection
13' Second axial projection
14 Planetary gear
15 Sun gear
16 Pin
17 Longitudinal axis
18 First spline system
19 First dog toothing system
20 Second dog toothing system
21 Second spline system
22 Third dog toothing system
23 Fourth dog toothing system
24 Spring element
25 Actuating arm
26 Inner disks
27 Outer disks
28 Clutch basket

The invention claimed is:

1. A differential gear for a motor vehicle, comprising:
an outer housing, the outer housing being drive-connected to an input element,
an inner housing, the inner housing being mounted rotatably at least partially within the outer housing,
at least two compensating elements and at least two output elements, the compensating elements and the output elements being enclosed at least partially by the inner housing, and the inner housing being drive-connected to the output elements via the compensating elements,
a switching unit being arranged on the inner housing, wherein the switching unit is selectively actuatable to a plurality of positions including a freewheeling position in which the outer housing and the inner housing are drivingly disconnected, a first position in which the switching unit is drive-connected to the outer housing, and a second position in which the switching unit is drive-connected to the outer housing and one of the two output elements.

2. The differential gear as claimed in claim 1, wherein the switching unit comprises a first switching element, wherein the first switching element is selectively actuatable to the first position where the first switching element is drive-connected to the outer housing.

3. The differential gear as claimed in claim 2, wherein the first switching element is configured as a first selector sleeve and wherein the first selector sleeve is in a positive locking engagement with the outer housing in the first position.

4. The differential gear as claimed in claim 2, wherein the switching unit includes a second switching element, wherein the second switching element is selectively actuatable to the second position following actuation of the first switching element to the first position, wherein in the second position the second switching element is drive-connected to one of the two output elements and the first switching element is drive-connected to the outer housing.

5. The differential gear as claimed in claim 4, wherein the second switching element is configured as a second selector sleeve and the second selector sleeve is in positive locking engagement with an output shaft that is drivingly connected with one of the two output elements in the second position.

6. The differential gear as claimed in claim 1, wherein the input element is connected fixedly to the outer housing by means of a welded connection.

7. The differential gear as claimed in claim 1, wherein the differential gear is configured as a spur gear mechanism.

8. The differential gear as claimed in claim 1, wherein the switching unit is enclosed neither by the outer housing nor by the inner housing.

9. The differential gear as claimed in claim 1, wherein a first subset of the at least two compensating elements mesh with a first output element of the at least two output elements, and a second subset of the at least two compensating elements mesh with a second output element of the at least two output elements.

10. The differential gear as claimed in claim 1, wherein the switching unit includes an axially extending dog toothing system on a side facing the outer housing, and wherein the outer housing includes an axially extending second dog toothing system on a side facing the switching unit, wherein the first and second dog toothing systems are in positive locking engagement in the first position.

11. The differential gear as claimed in claim 10, wherein the switching unit includes a third dog toothing system on a side facing the outer housing, and wherein a fourth dog toothing system is disposed on an outer circumference of an output shaft that is drivingly connected to one of the two output elements, wherein in the second position the third and fourth dog toothing systems are in positive locking engagement and the first and second dog toothing systems are in positive locking engagement.

12. The differential gear as claimed in claim 10, wherein the switching unit includes a friction clutch having a first part drivingly connected with an output shaft that is drivingly connected to one of the two output elements and a second part that is driving connected with the inner housing, wherein the first part and the second part of the friction clutch are frictionally lockingly engaged in the second position to drivingly lock the inner housing to the output shaft.

13. The differential unit as claimed in claim 10, wherein the inner housing and the outer housing are positively locked via engagement of the first and second dog toothing systems.

14. The differential unit as claimed in claim 1, wherein, in the second position, the outer housing is locked to an output shaft that is drivingly connected to one of the two output elements and a compensating function of the differential gear is disabled.

15. The differential gear as claimed in claim 4, wherein the second switching element is configured as a friction clutch and the friction clutch is frictionally coupled with an output shaft that is drivingly connected with one of the two output elements in the second position.

16. A differential gear for a motor vehicle, comprising:
an outer housing, the outer housing being drive-connected to an input element,
an inner housing, the inner housing being mounted rotatably at least partially within the outer housing,
at least two compensating elements and at least two output elements, the compensating elements and the output elements being enclosed at least partially by the inner housing, and the inner housing being drive-connected to the output elements via the compensating elements,
a switching unit being arranged on the inner housing, wherein at least a first portion of the switching unit is axially displaceable on the outer housing, and at least a second portion of the switching unit is axially displaceable on the inner housing, wherein the switching unit is selectively actuatable from a freewheeling position in which the outer housing and the inner housing are drivingly disconnected to a non-freewheeling position in which the first portion and the second portion of the switching unit are lockingly engaged and a force flow occurs from the outer housing to at least one output shaft that is drive connected to one of the output elements.

17. The differential gear of claim 16, wherein the switching unit is a friction clutch.

18. The differential gear of claim 17, wherein the first portion of the switching unit is a plurality of inner discs of the friction clutch, and the second portion of the switching unit is a clutch basket having outer discs fixed thereto.

19. The differential gear of claim 18, wherein the clutch basket is arranged on an axial projection of the inner housing.

20. The differential gear of claim 19, wherein the clutch basket is axially displaceable on the inner housing via a spline system.

* * * * *